(12) United States Patent
Mabeck et al.

(10) Patent No.: US 8,179,590 B1
(45) Date of Patent: May 15, 2012

(54) ELECTRO-OPTICAL DISPLAY

(75) Inventors: Jeffrey Todd Mabeck, Corvallis, OR (US); Gregg Alan Combs, Monmouth, OR (US); Tim R. Koch, Corvallis, OR (US); Pavel Kornilovich, Corvallis, OR (US); Jong-Souk Yeo, Corvallis, OR (US); Brad Benson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 71 days.

(21) Appl. No.: 12/951,348

(22) Filed: Nov. 22, 2010

(51) Int. Cl.
*G02B 26/00* (2006.01)
*G09G 3/34* (2006.01)

(52) U.S. Cl. ........................ 359/296; 345/107
(58) Field of Classification Search .......... 345/107; 359/296

See application file for complete search history.

(56) References Cited

U.S. PATENT DOCUMENTS

| | | | |
|---|---|---|---|
| 6,721,083 B2 | 4/2004 | Jacobson et al. | |
| 2007/0206262 A1 | 9/2007 | Zhou | |
| 2008/0304135 A1 | 12/2008 | Van Delden et al. | |
| 2010/0006441 A1 | 1/2010 | Renaud et al. | |
| 2010/0090943 A1 | 4/2010 | Fricke et al. | |
| 2010/0109834 A1 | 5/2010 | Kosowsky et al. | |
| 2010/0127249 A1 | 5/2010 | Kim et al. | |
| 2010/0182290 A1 | 7/2010 | Matsuoka et al. | |
| 2010/0245981 A1 | 9/2010 | Yeo et al. | |
| 2011/0149376 A1* | 6/2011 | Mabeck et al. | 359/296 |
| 2011/0304905 A1* | 12/2011 | Yeo et al. | 359/296 |

OTHER PUBLICATIONS

Hewlett-Packard Development Company, L.P. "System and Method for Tri-State Electro-Optical Displays", PCT Application No. PCT/US2010/044870, Filed Aug. 9, 2010, pp. 33.

* cited by examiner

*Primary Examiner* — David N Spector (57) ABSTRACT

An electro-optical display includes colorant particles that are suspended in a carrier fluid. The colorant particles are controlled by three different types of electrodes. An exposed electrode acts on the colorant particles in an electrokinetic manner by compacting the colorant particles. A passivated electrode acts on the colorant particles in an electrostatic manner by holding the colorant particles once compacted. A reference electrode attracts the colorant particles to compaction areas.

20 Claims, 7 Drawing Sheets

ELECTRO-OPTICAL DISPLAY

BACKGROUND

Electrophoresis is the translation of charged objects in a fluid in response to an electric field. Electrophoretic inks are useful as a medium to enable bistable, low power types of displays. Electrophoretic displays have been developed using a dyed fluid and white particles sandwiched between parallel electrodes on top and bottom substrates. When an electric field is applied transverse to the substrates across the dyed fluid to translate the white particles to the viewing surface, the display appears white. When the electric field is reversed to translate the white particles away from the viewing surface, the display appears the color of the dyed fluid. Similarly, electrophoretic displays have also been developed using a clear fluid with two differently colored particles of opposite charge (e.g., positively charged white particles and negatively charged black particles) sandwiched between parallel electrodes on top and bottom substrates. When the electrode on the viewing side is charged negatively, the positively charged white particles are translated to the viewing surface, and the display appears white. When the electrode on the viewing side is charged positively, the negatively charged black particles are translated to the viewing surface, and the display appears black. Conventional electrophoretic architectures typically use electrodes that are electrically insulated from the colorant particles and the carrier fluid such that there is no significant steady state current flow. The prior embodiments using parallel electrodes to translate particles transverse to the top and bottom substrates do not enable a transparent state. When the top surface is color A, then the bottom surface will appear color B, and vice versa.

A transparent state can be enabled by "in-plane" electrophoretic displays, in which electrodes are arranged to apply electric fields that are substantially parallel to the substrates to translate colorant particles through a clear fluid parallel to the substrates. This allows the colorant particles to be collected out of the viewing area of the display to create a transparent state. The colorant particles can also be spread across the viewing area of the display to create a colored state. Since the travel distances required for in-plane electrophoretic displays are typically much larger, the switching speeds are typically much slower. Reducing the travel distance has the undesired effect of reducing the clear aperture of the viewing area for a given electrode width. Such an architecture requires electrical cross-over of in-plane electrodes that increases manufacturing complexity.

For the reasons stated above and for other reasons that will become apparent to those skilled in the art upon reading and understanding the present specification, there is a need in the art for alternate ways to control colorant particles in an optical display.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure. It is to be understood that other embodiments may be utilized and that process, chemical or electrical changes may be made without departing from the scope of the present disclosure. The following detailed description is, therefore, not to be taken in a limiting sense, and the scope of the present disclosure is defined by the appended claims and equivalents thereof.

As used herein, the term "grayscale" applies to both black and white images and monochromatic color images. Grayscale refers to an image including different shades of a single color produced by controlling the density of the single color within a given area of a display. The term "over" is not limited to any particular orientation and can include above, below, next to, adjacent to, and/or on. In addition, the term "over" can encompass intervening components between a first component and a second component where the first component is "over" the second component. The term "electro-optical display" is an information display that forms visible images using one or more of electrophoresis, electro-convection, electrochemical interactions, and/or other electrokinetic phenomena. The term "electro-optical display" is used interchangeably with the terms "electrokinetic display" and "electrostatic display". Particles moved in an electrokinetic manner can be moved by one or more of electrophoresis, electro-convection, and/or electrochemical interactions. Electrophoresis is the movement of suspended particle through a medium under the action of an electrostatic force applied using electrodes. In practice, particles may be moved electrophoretically or held against a surface by an electrostatic field. The display elements subsequently described use both out-of-plane movement as well as in-plane movement of colorant particles to provide the desired optical appearance.

The present embodiments encompass optical display elements that use a hybrid system of electrokinetic switching and electrostatic holding using three or more electrode types. The embodiments comprise a reference electrode that is either geometrically defined or is a blanket conductor with a patterned dielectric layer. Two types of activating electrodes comprise an exposed electrode for compacting (i.e., moving) colorant particles electrokinetically and a passivated electrode for holding colorant particles electrostatically.

A passivated electrode is one that is covered by a dielectric material. The said dielectric material effectively blocks electrical conductivity between the electrode and the carrier fluid. Since the passivated electrode is insulated from contact with the carrier fluid and charged colorant particles, this electrode interacts with the charged colorant particles by way of an electric field. The compacting electrode is exposed to the carrier fluid and the charged colorant particles and, thus, results in non-negligible steady-state current flow that impacts the motion of the particles.

In general, a colorant particle may have a size between several nanometers and several microns and has the property of changing the spectral composition of the incident light by absorbing and/or scattering certain portions of the spectrum. As a result, the particle appears colored which provides a desired optical effect. In other embodiments, the colorant can be a dye that comprises single absorbing molecules.

The colorant particles in the carrier fluid comprise a charged material. In one embodiment, the colorant particle is able to hold a stable charge indefinitely so that repeated operation of the element does not affect the charge on the colorant particles. However, colorant particle materials having a finite ability to hold a stable charge can be used in accordance with the various embodiments while they maintain their charge.

The carrier fluid can include both polar fluids (e.g. water) and non-polar fluids (e.g., dodecane). Additionally, anisotropic fluids such as liquid crystal can be used. The fluid may include surfactants such as salts, charging agents, stabilizers, and dispersants. In one embodiment, the surfactants provide a fluid that is an electrolyte that is able to sustain current by ionic mass transport.

The substrates on which the electrodes of the subsequent embodiments are formed can be made of plastic, glass, or some other clear material. Only one of the substrates needs to be clear. The other substrate can be either clear or an opaque material. The substrates can be coated with or comprise a reflective material. In still another embodiment, a light scatterer can be formed on the subsequently described dielectric material.

Figure 1:
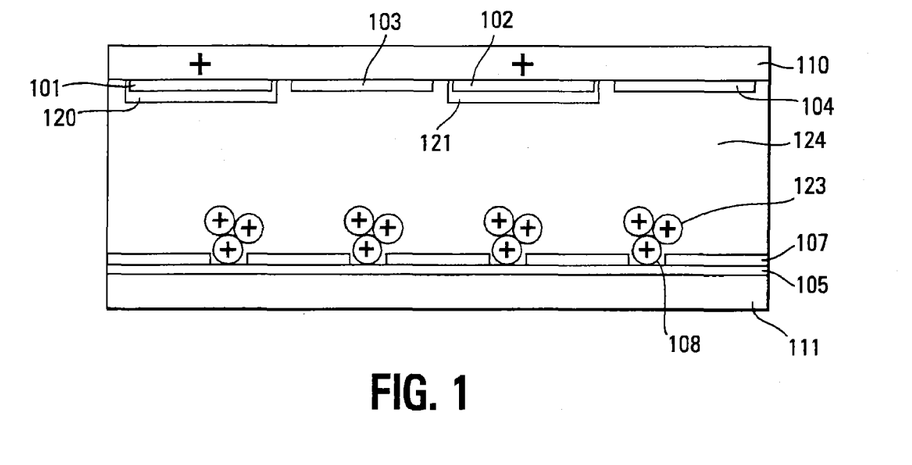
FIG. 1 depicts a cross-sectional view of one embodiment of an electro-optical display.

FIG. 1 illustrates a cross-sectional view of one embodiment of a hybrid electrokinetic and electrostatic display. This embodiment includes both the holding electrodes 101, 102 and the compacting electrodes 103, 104 on the same side that is opposite to the side with the reference blanket electrode 105. In this embodiment, the holding electrodes 101, 102 perform an electrostatic holding function and the compacting electrodes 103, 104 perform an electrokinetic switching function.

This embodiment comprises upper 110 and lower 111 substrates. The holding electrodes 101, 102 and the compacting electrodes 103, 104 are both formed on one substrate 110 and separated geometrically. The reference electrode 105 is formed on the opposing substrate 111. In the illustrated embodiment, the holding and compacting electrodes 101-104 are formed on the upper substrate 110 and the reference electrode is formed on the lower substrate 111. An alternate embodiment can form the holding and compacting electrodes 101-104 on the lower substrate 111 and the reference electrode can be formed on the upper substrate 110.

The reference electrode 105 is a blanket electrode upon which a dielectric material 107 is formed and patterned. The patterning of the dielectric material 107 creates the recesses 108 through which portions of the blanket electrode 105 are exposed to the carrier fluid 124 and colorant particles 123. Through operation of the display, the colorant particles 123 can be compacted into the recesses 108 that act as collection areas.

The holding electrodes 101, 102 are covered by a dielectric material 120, 121 that insulates these electrodes 101, 102 from the carrier fluid 124 and the colorant particles 123. The compacting electrodes 103, 104 remain exposed to the carrier fluid 124 and the colorant particles 123.

The dielectric material 107, 120, and 121 can be a transparent insulating material, an opaque insulating material, or a reflective insulating material. For example, the upper dielectric material 120, 121 might be transparent while the lower dielectric material 107 might be reflective.

The recesses 108 can be manufactured by many different processes. These processes include embossing or imprinting with a master or stamp or etching of the dielectric layer 107. The recessed regions 108 can be any size and/or shape.

The depth of the recesses 108 in the dielectric layer 107 can be defined by the following equation:

$$h_m = \frac{L}{L_m - L} \cdot \frac{d}{1 - P}$$

where L is the colorant particle load by volume, $L_m$ is the maximum closed packed colorant particle load by volume, d is the thickness of the main element display volume and P is the aperture ratio defined by $1-A_0/A$. The quantity A is the area of the element display volume while $A_0$ is the recess area. This formula for the aperture ratio is true when all the top electrodes 101, 103, and their coatings 120, 121 are transparent.

In one embodiment, the total area of the defined recess regions of the blanket electrode 105 is between 1% and 10% of the area of the display element in order to maximize the optical contrast between the clear and the dark states. However, the present embodiments are not limited to any predefined aperture ratio. For example, an alternate embodiment might have a total area of the recessed regions being between 10% and 20% of the area of the display element. Still another embodiment might have a total area of the recessed regions being between 20% and 50% of the area of the display element. Other embodiments might have a total area of the recessed regions being >50% of the area of the display element for embodiments where low optical contrast is required.

As an example of operation, the optical display is in a diffuse or dark state when no power is applied to the display. In this state, the colorant particles 123 are uniformly dispersed throughout the viewing area of the display. To clear the display, a positive voltage (e.g., 30V) is applied to the compacting electrodes 103, 104 or to all the electrodes 101 to 104, while a negative voltage is applied to the blanket reference electrode 105. Thus, the positively charged colorant particles are collected into the recesses 108 adjacent to the reference electrode 105.

After the colorant particles 123 are compacted into the recesses 108, power to the compacting electrodes 103, 104 or to all the electrodes 101 to 104 is switched to apply predominantly to the holding electrodes 101, 102. The electric field generated by the passivated electrodes 101, 102 holds the colorant particles 123 in the recesses 108 electrostatically.

Figure 2:
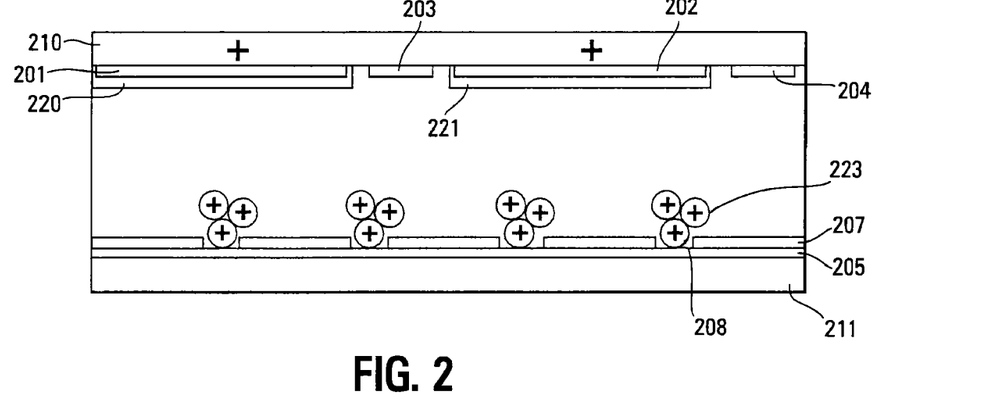
FIG. 2 depicts a cross-sectional view of an alternate embodiment of an electro-optical display.

FIG. 2 illustrates a cross-sectional view of an alternate embodiment of an electro-optical display. This embodiment is similar to the embodiment of FIG. 1 in that the holding electrodes 201, 202 and compaction electrodes 203, 204 are formed on the same substrate 210 and separated geometrically. A dielectric material 220, 221 is formed over the holding electrodes 201, 202. The reference electrode 205 is a blanket electrode formed on the opposing substrate 211 with a patterned dielectric layer 207 formed on the reference electrode 205.

The embodiment of FIG. 2 uses holding electrodes 201, 202 that are larger than the compaction electrodes 203, 204. Since the small amount of current flowing between the compacting electrodes 203, 204 and reference electrode 205 is sufficient to create effective compaction, the compacting electrodes 203, 204 can have an overall area that is less than the holding electrodes 201, 202. The holding electrodes 201, 202 can have a larger area to hold the colorant particles 223 in place in the recesses 208 electrostatically.

Figure 3:
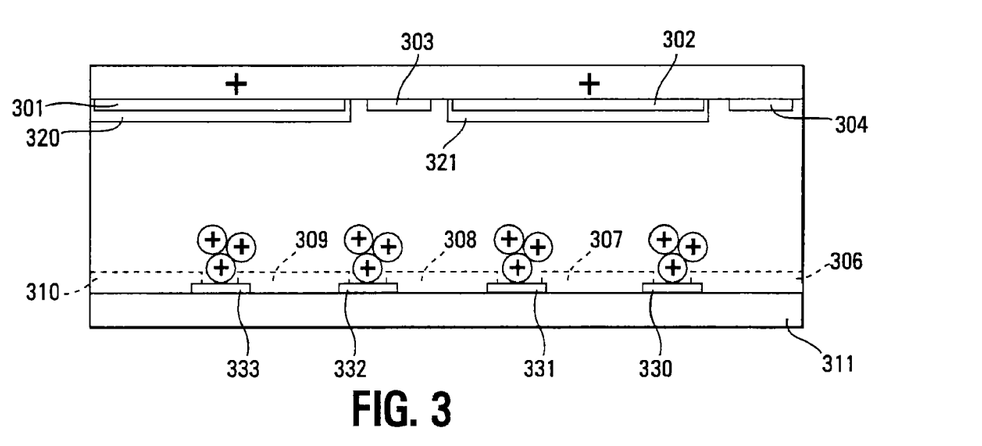
FIG. 3 depicts a cross-sectional view of another embodiment of an electro-optical display.

FIG. 3 illustrates a cross-sectional view of another alternate embodiment of an electro-optical display. This embodiment also forms the holding electrodes 301, 302 and compacting electrodes 303, 304 on the same side and separated geometrically. A dielectric material 320, 321 is formed over the holding electrodes 301, 302. The reference electrodes are formed on an opposing substrate 311.

Instead of a blanket reference electrode, the embodiment of FIG. 3 includes a patterned reference electrode 330-333 such that each holding area for the colorant particles comprises a separate reference electrode 330-333. No dielectric material is necessary on the reference electrode side of the display for proper operation. However, if recesses are desired to hold the colorant particles, a patterned dielectric 306-310 can be formed on the reference electrode side of the display. The dielectric material 306-310 may or may not partially overlap the reference electrodes 330-333.

Figure 4:
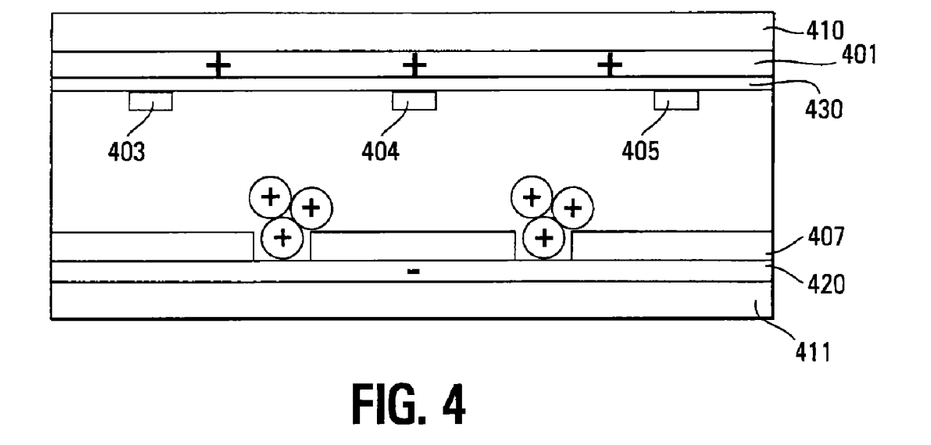
FIG. 4 depicts a cross-sectional view of yet another embodiment of an electro-optical display.

FIG. 4 illustrates a cross-sectional view of yet another alternate embodiment of an electro-optical display. This embodiment also forms both the holding electrode 401 and compacting electrodes 403-405 on one substrate 410. However, this embodiment separates these electrodes by a dielectric material 430 instead of geometrically.

The embodiment of FIG. 4 forms the holding electrode 401 on the substrate 410 as a blanket electrode. A dielectric material 430 is then formed over the holding electrode 401. The compacting electrodes 403-405 are formed on the dielectric material 430.

As in the other embodiments, the reference electrode 420 is formed on the opposing substrate 411. A patterned dielectric material 407 is formed over the blanket reference electrode 420 to form the recesses for the colorant particles. While this embodiment shows the reference electrode 420 as being a blanket electrode, an alternate embodiment can use the patterned reference electrode as illustrated in the embodiment of FIG. 3.

The blanket holding electrode 401 and dielectric material 430 can be transparent or opaque depending on whether they are formed on the viewing side of the electro-optical display or the opposite of the viewing side. In one embodiment, in order to allow the holding electrostatic field between the holding electrode 401 and the reference electrode 420, the compacting electrodes 403-405 occupy a smaller area while designed to provide compaction of the colorant particles.

Figure 5:
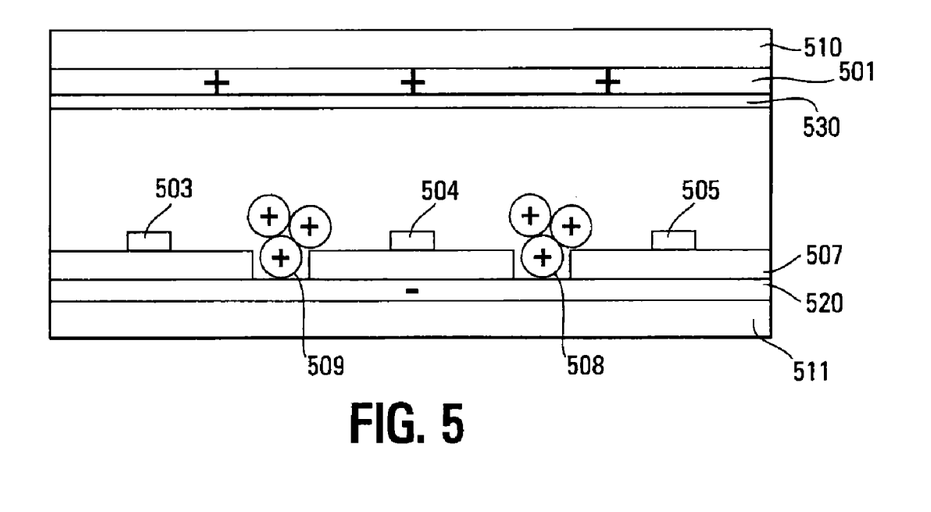
FIG. 5 depicts a cross-sectional view of yet another embodiment of an electro-optical display.

FIG. 5 illustrates a cross-sectional view of yet another alternate embodiment of an electro-optical display. This embodiment forms the compacting electrodes 503-505 and the holding electrode 501 on opposite sides of the electro-optical display.

In this embodiment, the holding electrode 501 is a blanket electrode that is formed on the substrate 510. A dielectric material 530 is formed over the holding electrode 501 to insulate the holding electrode 501 from the carrier fluid and colorant particles. The holding electrode 501 and dielectric material 530 are transparent if formed on the viewing side of the display or may be opaque if formed on the side opposite to the viewing side.

A reference electrode 520 is formed as a blanket electrode on the opposite substrate 511. A dielectric layer 507 is formed on the reference electrode 520 and patterned to form the recesses 508, 509 and expose portions of the reference electrode 520. The compacting electrodes 503-505 are formed on the dielectric layer 507 between the recesses 508, 509. While this embodiment shows the reference electrode 520 as being a blanket electrode, an alternate embodiment can use the patterned reference electrode as illustrated in the embodiment of FIG. 3.

Figure 6:
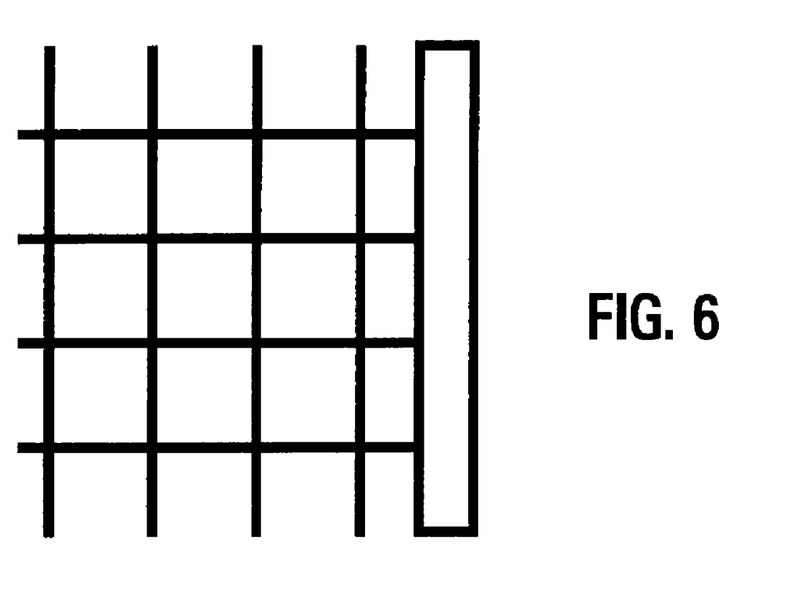
FIG. 6 depicts a top view of one embodiment of an electro-optical display.
Figure 7:
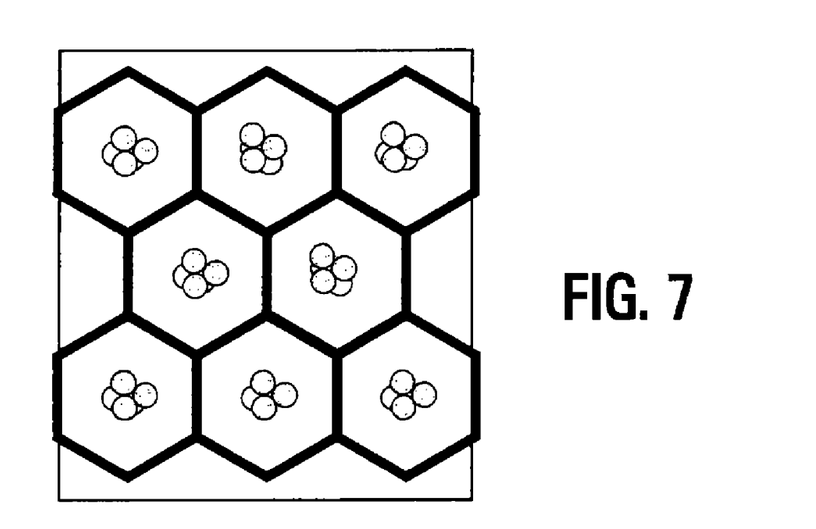
FIG. 7 depicts a top view of another embodiment of an electro-optical display.

FIGS. 6 and 7 illustrate top views of two embodiments of the layout of the electro-optical displays. These views are looking through the transparent viewing side of the display. The square embodiment of FIG. 6 is one embodiment of a metal electrode 403 as illustrated in FIG. 4. Other configurations, such as hexagonal, lines, etc. can also be used to build compacting electrodes on top of the dielectric layer in FIG. 4.

The hexagonal embodiment of FIG. 7 is one embodiment of a top view of the structure depicted in FIG. 5 where dots are defined with patterned dielectric and lines on top of the dielectric that is defined as a hexagonal shape. The embodiments of FIGS. 6 and 7 are for purposes of illustration only as the present embodiments are not limited to any one shape.

Figure 8:
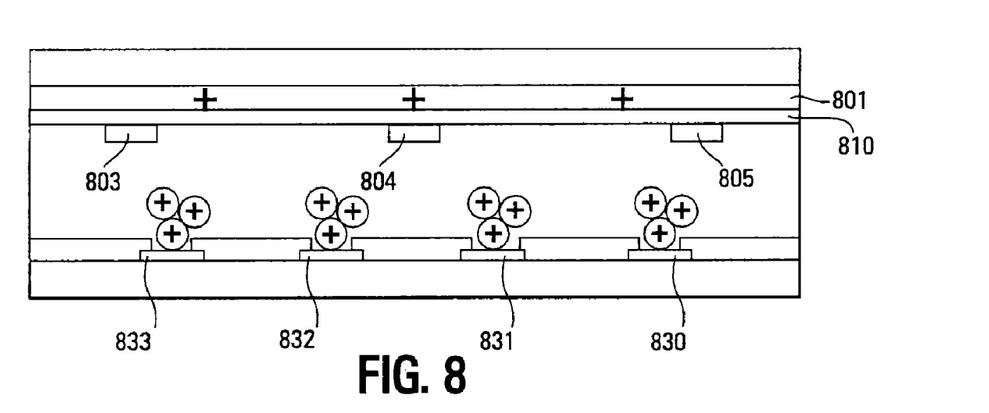
FIG. 8 depicts a cross-sectional view of yet another embodiment of an electro-optical display.

FIG. 8 illustrates a cross-sectional view of yet another alternate embodiment of an electro-optical display. This embodiment uses a patterned reference electrode 830-833 with a holding electrode 801 covered by a dielectric 810 on which the exposed compacting electrodes 803-805 are formed.

Figure 9:
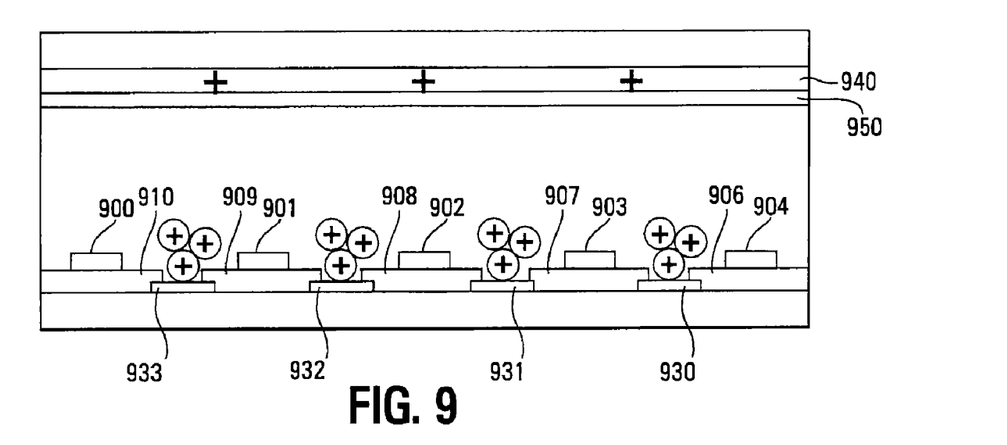
FIG. 9 depicts a cross-sectional view of yet another embodiment of an electro-optical display.

FIG. 9 illustrates a cross-sectional view of yet another alternate embodiment of an electro-optical display. This embodiment uses a patterned reference electrode 930-933. A patterned dielectric 906-910 can be formed on the reference electrode side of the display. The dielectric material 906-910 may or may not partially overlap the reference electrodes 930-933. The exposed compacting electrodes 900-904 are formed on the dielectric material 906-910. The holding electrode 940 is a blanket electrode covered by a dielectric material 950.

The above-described embodiments can not only be used to create transparent and dark display modes but also multiple grayscale states. As discussed previously, when the colorant particles are spread out throughout the carrier fluid, the display assumes the color of the colorant particle. When the colorant particles are compacted into the recesses, the display is light. When some of the colorant particles are compacted and some are spread out, various levels of gray of that color can be achieved.

The different levels of gray can be achieved by controlling the amount of colorant particles that are spread out in the viewing area of the display element. Amplitude and pulse width modulation can be used during the compaction operation (i.e., electrokinetic switching phase) with the compaction electrode to produce the grayscale states between the colored state and the light state. As an example of pulse width modulation, by controlling the amount of time that the compaction electrodes are turned on, the amount of colorant particles that are compacted is controlled. Thus, the longer the positive voltage pulse applied to the compaction electrodes, the lighter the display becomes. The holding electrodes can then be used to maintain the selected grayscale state during the electrostatic holding phase.

In the above-described embodiments, the polarities discussed for the operational voltages assume that the colorant particles are positively charged. In an embodiment where the colorant particles are negatively charged, the polarities of the operational voltages will be reversed.

Figure 10:
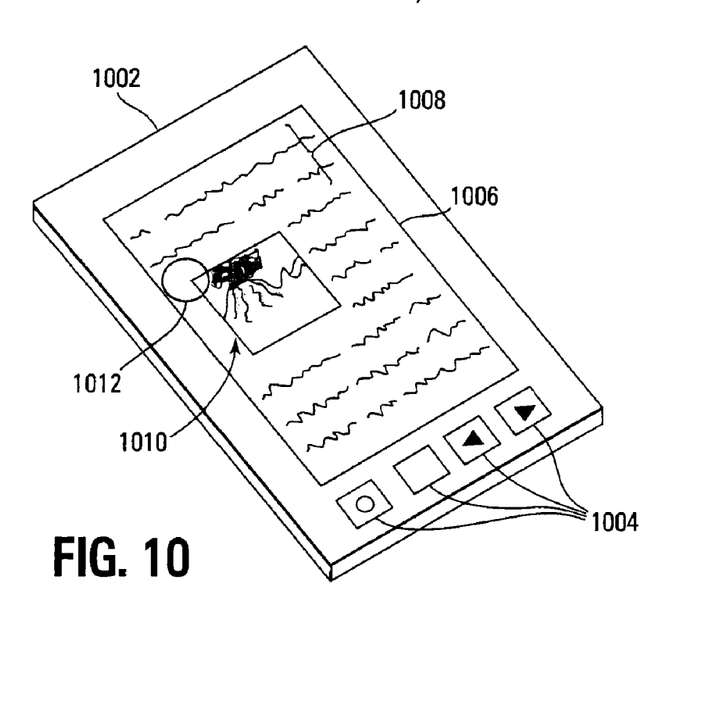
FIG. 10 depicts an electronic display device in accordance with the electro-optical display of the present disclosure.

FIG. 10 is an electronic display device 1000 that uses the presently disclosed electro-optical display. The electronic display device 1000 can have a case 1002 that may be made from plastic, metal, or other material. The electronic display device can be an electronic book reader, a shelf tag, a skin (surface display) for an electronic device, a sign, a price display or other display, or any combinations thereof. The case 1002 can include a number of buttons 1004 to control the electronic display device 1000, for example, selecting a publication, turning a page, or opening a connection to a server. The display cells can have multiple states that allow the display 1006 to display high-contrast text 1008 and images 1010. A magnified view 1012 of a portion of the display 1006 is shown in FIG. 11.

Figure 11:
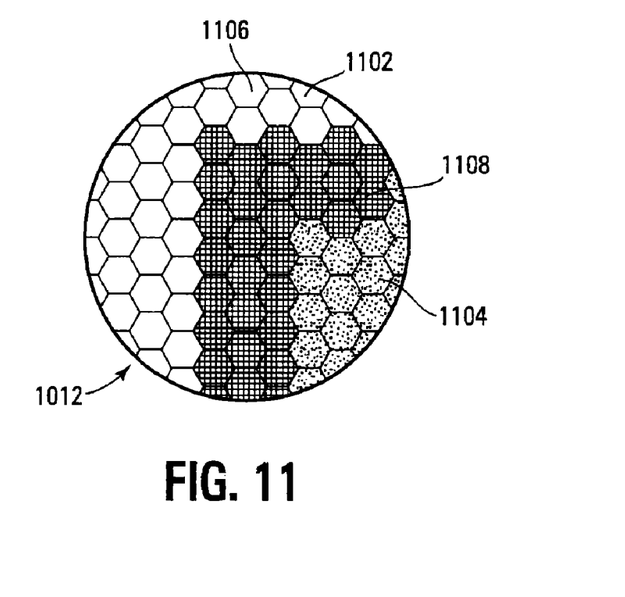
FIG. 11 depicts a magnified view of a portion of an electro-optical display that can incorporate the present embodiments.

FIG. 11 is a magnified view 1012 of a portion of the display 1006 of FIG. 10. In the magnified view 1012, individual pixels 1102 are shown. Each pixel 1102 can include one or more electro-optical display cells that may act as sub-pixels to allow the pixel 1102 to display different colors. Although the pixels 1102 are shown as hexagons, they may be any appropriate shape, including squares, circles, and the like. The pixels 1102 may be a shape that allows tessellation of pixels 1102, such as a square, rectangle, triangle, or hexagon (as shown). As an example, multiple states of the pixels 1102 are shown in the magnified view 1012, in which a first group of the pixels 1104 are displaying a color, a second group of the pixels 1106 are displaying white, and a third group of the pixels 1108 are displaying black.

Although specific embodiments have been illustrated and described herein it is manifestly intended that the scope of the claimed subject matter be limited only by the following claims and equivalents thereof.

What is claimed is:

1. An electro-optical display comprising:
   colorant particles suspended in a carrier fluid;
   an exposed electrode configured to compact the colorant particles into collection areas
   a passivated electrode configured to hold the colorant particles in the collection areas; and
   a reference electrode configured to attract the colorant particles onto the collection areas.

2. The electro-optical display of claim 1 wherein the electro-optical display is part of a sub-pixel of an electronic display.

3. The electro-optical display of claim 1 wherein the passivated electrode is covered by a dielectric material.

4. The electro-optical display of claim 1 wherein the colorant particles are comprised of a plurality of different colored colorant particles having at least one charge polarity.

5. The electro-optical display of claim 1 wherein the passivated electrode is configured to generate an electric field after a set amount of the colorant particles are collected in the collection areas.

6. The electro-optical display of claim 1 and further including a dielectric material formed on the reference electrode wherein the dielectric material is patterned to expose areas of the reference electrode that act as the collection areas.

7. The electro-optical display of claim 1 wherein the exposed electrode and the passivated electrode are coupled to a first side of the electro-optical display and are separated either geometrically or by a dielectric layer and the reference electrode is coupled to a second side of the electro-optical display that is opposite the first side.

8. The electro-optical display of claim 1 wherein the exposed electrode and the passivated electrode comprise transparent conductive materials and a dielectric on the reference electrode comprises a reflective material.

9. The electro-optical display of claim 1 and further including:
   a first dielectric material coupled to the reference electrode and patterned to form exposed areas of the reference electrode to act as the collection areas, wherein
   the passivated electrode is a blanket electrode coupled to a first substrate and covered by a second dielectric material between the passivated electrode and the carrier fluid;
   the reference electrode is coupled to a second substrate opposite the first substrate; and
   the exposed electrode is coupled to the first dielectric material between the exposed areas of the first dielectric material.

10. An electro-optical display comprising:
    colorant particles suspended in a carrier fluid;
    an exposed electrode coupled to a first substrate and configured to act on the colorant particles in an electrokinetic manner;
    a passivated electrode coupled to the first substrate and configured to act on the colorant particles in an electrostatic manner; and
    a reference electrode coupled to a second substrate and configured to attract the colorant particles onto collection areas, wherein the second substrate is on an opposing side of the electro-optical display from the first substrate.

11. The electro-optical display of claim 10 wherein the passivated electrode is larger than the exposed electrode.

12. The electro-optical display of claim 10 wherein the passivated electrode is a blanket electrode coupled to the first substrate and a dielectric material separates the exposed electrode from the passivated electrode.

13. The electro-optical display of claim 10 wherein the carrier fluid is one of:
    a polar fluid, a non-polar fluid, or an anisotropic fluid.

14. The electro-optical display of claim 10 wherein the electro-optical display is part of a pixel of an electronic display.

15. The electro-optical display of claim 10 wherein the reference electrode is a patterned electrode resulting in a plurality of reference electrodes that are each a collection area.

16. The electro-optical display of claim 15 and further including a patterned dielectric material coupled to the second substrate and having openings for each of the plurality of reference electrodes.

17. A method for operating an electro-optical display having a carrier fluid with charged colorant particles, the method comprising:
    biasing a first electrode with a first voltage;
    biasing a second electrode with a second voltage such that the charged colorant particles are moved to the collection areas; and
    biasing a third electrode with a third voltage to hold the charged colorant particles on the collection areas.

18. The method of claim 17 wherein the electronic display comprises a plurality of electro-optical displays as pixels in the display.

19. The method of claim 17 wherein the biasing of the third electrode with the third voltage occurs only after the first electrode is no longer biased with the first voltage.

20. The method of claim 19 wherein the electro-optical display is part of an electronic display of a book reader, a shelf label, a skin for an electronic device, a sign, a price display, or any combination thereof.

* * * * *